United States Patent
Kanasugi et al.

(10) Patent No.: US 8,074,096 B2
(45) Date of Patent: Dec. 6, 2011

(54) SEMICONDUCTOR INTEGRATED CIRCUIT, MEMORY SYSTEM, MEMORY CONTROLLER AND MEMORY CONTROL METHOD

(75) Inventors: Masami Kanasugi, Kawasaki (JP); Koichi Kuroiwa, Kawasaki (JP); Makoto Muranushi, Kawasaki (JP); Koji Nozoe, Kawasaki (JP); Kunimitsu Itashiki, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 902 days.

(21) Appl. No.: 12/049,551

(22) Filed: Mar. 17, 2008

(65) Prior Publication Data

US 2008/0229135 A1    Sep. 18, 2008

(30) Foreign Application Priority Data

Mar. 15, 2007    (JP) ................. 2007-066995

(51) Int. Cl.
  *G06F 1/00*    (2006.01)
  *G06F 1/12*    (2006.01)
  *G06F 12/00*   (2006.01)
(52) U.S. Cl. .............. 713/500; 713/400; 711/167
(58) Field of Classification Search .......... 713/500, 713/400
  See application file for complete search history.

(56) References Cited

U.S. PATENT DOCUMENTS

| | | | |
|---|---|---|---|
| 3,896,418 A * | 7/1975 | Brown | 711/150 |
| 6,108,758 A * | 8/2000 | Liu | 711/167 |
| 6,457,075 B1 * | 9/2002 | Koutsoures | 710/35 |
| 6,892,281 B2 * | 5/2005 | Chaudhari et al. | 711/137 |
| 6,912,609 B2 * | 6/2005 | Stuber et al. | 710/107 |
| 7,516,254 B2 * | 4/2009 | Nanki et al. | 710/52 |
| 7,698,524 B2 * | 4/2010 | Lee et al. | 711/167 |

FOREIGN PATENT DOCUMENTS

JP    2003-015953 A    1/2003
WO   WO 9608774 A1 *  3/1996

* cited by examiner

*Primary Examiner* — Suresh Suryawanshi
(74) *Attorney, Agent, or Firm* — Arent Fox, LLP

(57) ABSTRACT

Aspects of the embodiment provide a semiconductor integrated circuit including a control terminal coupled to a memory through a control bus, a data terminal coupled to the memory through a data bus, a memory controller coupled to the control terminal and the data terminal and a first master and a second master coupled to the memory controller, wherein the memory controller supplies a control signal corresponding to a memory access based on the first master and a control signal corresponding to a memory access based on the second master to the control terminal in synchronism with a rising edge and a falling edge of a clock signal, respectively, and the memory controller receives and outputs input/output data of the first master and input/output data of the second master at the data terminal in synchronism with the rising edge and the falling edge, respectively.

13 Claims, 9 Drawing Sheets

SEMICONDUCTOR INTEGRATED CIRCUIT, MEMORY SYSTEM, MEMORY CONTROLLER AND MEMORY CONTROL METHOD

CROSS-REFERENCE TO RELATED APPLICATIONS

This application claims the benefit of priority of Japanese Patent Application No. 2007-66995, filed on Mar. 15, 2007, the entire contents of which are incorporated herein by reference.

BACKGROUND

1. Field

Aspects of the embodiment relate to a semiconductor integrated circuit, a memory system, a memory controller and a memory control method.

2. Description of the Related Art

The chip of a synchronous dynamic random access memory (SDRAM) or a flash memory is coupled to the chip of a system LSI including a processor, and the external memory chip is employed as a main memory. In the above-described chip, the mainstream is formed by a configuration wherein the SDRAM of double data rate (DDR) or DDR2 which outputs data at both trailing/leading clock edges is employed in order to heighten the speed of the operation of the system.

When the processor runs a program, it has used a conventional configuration where the memory area of the external chip as described above is not used as a program running area, instead a memory within the system LSI chip, such as a cache or a chip-on memory, is used as the running area. The memory within the system LSI chip is configured of, for example, a static random access memory (SRAM), which can be accessed at high speed.

In recent years, however, with enlargement in the size of the program to-be-run or the capacity of data to-be-processed, the capacity of the memory within the system LSI chip has often become insufficient as the area for running the program. In this case, the memory area of the external memory chip as stated above is directly used as the program running area.

Also in recent years, a plurality of processors have sometimes been installed on a single chip as a system-on chip. In such a case, the memory coupled outside the system LSI is shared by the plurality of processors on account of a limitation in the number of terminals of the LSI and for the purpose of decreasing the packaging area and the number of components.

When the memory is shared by the plurality of masters (the plurality of processors), an access conflict occurs among the masters. When the SDRAM or the flash memory which is used as the external memory, a latency for one access is large. When, for example, the SDRAM, a time period of 4 to 5 clock cycles is required from "bank-active" until first data is output. Accordingly, data should be read and written using a burst access to the utmost, not a single access. However, a burst operation causes a long time to be expended between the start of access and the end of data input/output in order to successively input/output data, and the other master which is not accessing the external memory needs to wait for its access. Thus, access latency increases, and the processing performance of the processor lowers.

The conventional memory system has the problem that the increase of the latency at the occurrence of the conflict of access to the external memory cannot be suppressed when the external memory is shared by the plurality of masters.

SUMMARY

Aspects of the embodiment provide a semiconductor integrated circuit including a control terminal coupled to a memory through a control bus, a data terminal coupled to the memory through a data bus, a memory controller coupled to the control terminal and the data terminal and a first master and a second master coupled to the memory controller, wherein the memory controller supplies a control signal corresponding to a memory access based on the first master and a control signal corresponding to a memory access based on the second master to the control terminal in synchronism with a rising edge and a falling edge of a clock signal, respectively, and the memory controller receives and outputs input/output data of the first master and input/output data of the second master at the data terminal in synchronism with the rising edge and the falling edge of the clock signal, respectively.

Additional advantages and novel features of aspects of the embodiment will be set forth in part in the description that follows, and in part will become more apparent to those skilled in the art upon examination of the following or upon learning by practice thereof.

DETAILED DESCRIPTION OF THE EMBODIMENTS

Figure 1:
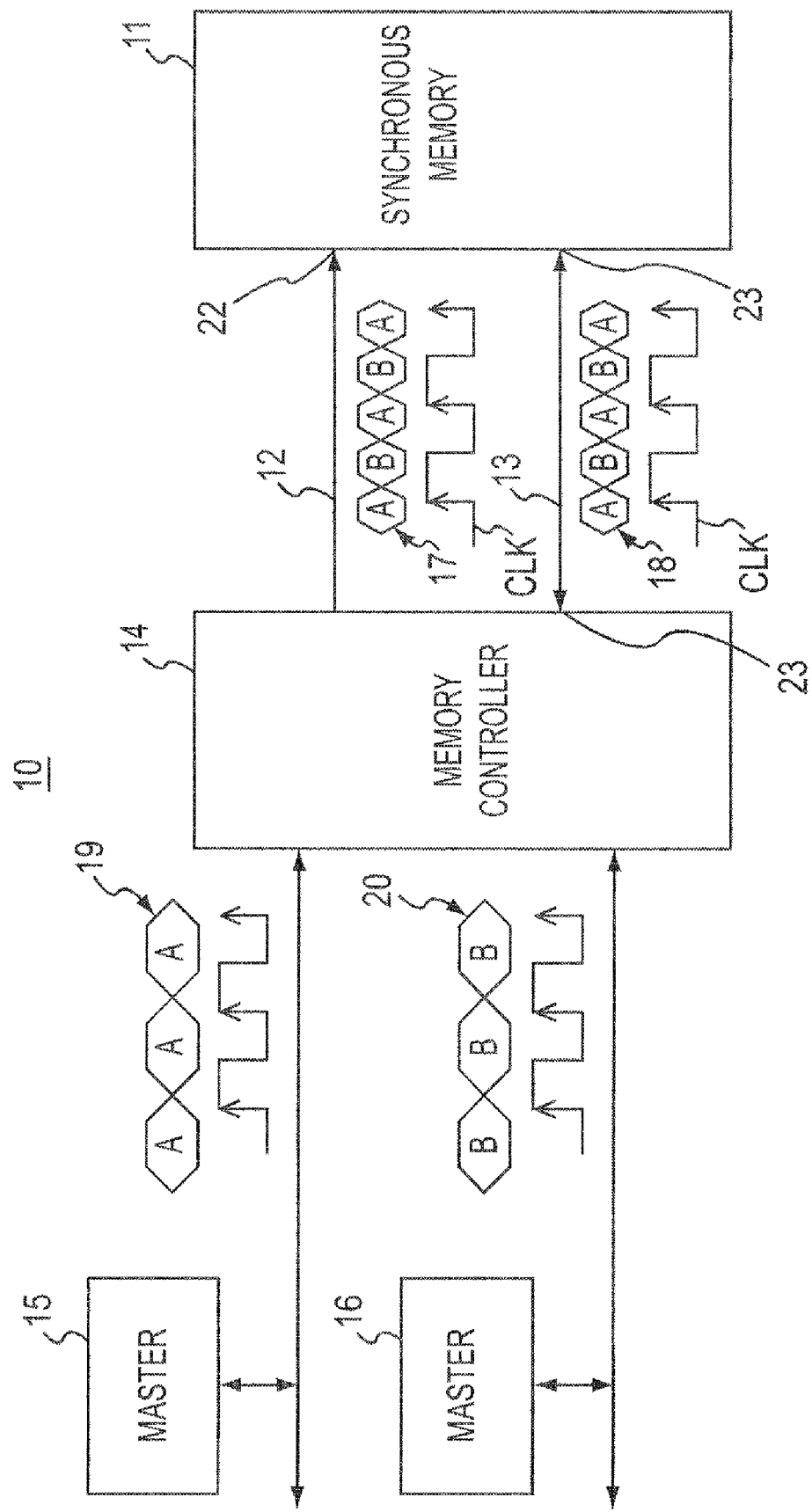
FIG. 1 illustrates the configuration and operating principle of a memory system according to an exemplary embodiment.

FIG. 1 illustrates the configuration and operating principle of a memory system according to an embodiment.

As shown in FIG. 1, the memory system 10 includes a synchronous memory 11 which is operated in synchronism with a clock signal, a control bus 12 which is coupled to the synchronous memory 11 via a control terminal 22, a data bus 13 which is coupled to the synchronous memory 11 via a control terminal 23, a memory controller 14 which is coupled to the control bus 12 and the data bus 13, and a first master 15 and a second master 16 which are coupled to the memory controller 14. The memory controller 14 and the first master 15, and the memory controller 14 and the second master 16 may be respectively coupled by separate signal paths as shown in the figure, or may well be coupled by a common bus. That is, it is also allowed that the first master 15 and the second master 16 are coupled to one common bus, which is coupled to the memory controller 14.

As further shown in FIG. 1, the memory controller 14 uses either the rising edge or the falling edge of the clock signal CLK as a first edge, and the other as a second edge, and it supplies the control bus 12 with a control signal corresponding to a memory access based on the first master 15 and a control signal corresponding to a memory access based on the second master 16, in synchronism with the first edge and the second edge, respectively. In the example shown in FIG. 1, the first edge is the rising edge, and in a memory access control signal 17 propagated on the control bus 12, a memory access control signal A corresponding to the first master 15 is synchronized with the rising edge of the clock signal CLK. Thus, the second edge is the falling edge, and in the memory access control signal 17 propagated on the control bus 12, a memory access control signal B corresponding to the second master 16 is synchronized with the falling edge of the clock signal CLK. Incidentally, the "memory access control signal" shall contain, not only memory access control signals in a narrow sense, such as /RAS, /CAS and /WE, but also an address signal.

As further shown in FIG. 1, the memory controller 14 also supplies the data bus 13 with the input/output data 19 of the first master 15 and the input/output data 20 of the second master 16 in synchronism with the first edge and the second edge, respectively. In the example shown in FIG. 1, the first edge is the rising edge, and in a data signal 18 propagated on the data bus 13, a data signal A corresponding to the first master 15 is synchronized with the rising edge of the clock signal CLK. The second edge is the falling edge, and in the data signal 18 propagated on the data bus 13, a data signal B corresponding to the second master 16 is synchronized with the falling edge of the clock signal CLK.

As further shown in FIG. 1, the synchronous memory 11 performs the input of the memory access control signals and the input/output of the data signals in synchronism with both the rising edge and the falling edge of the clock signal CLK. The memory access control signal corresponding to the rising edge and the memory access control signal corresponding to the falling edge are independent of each other, and are signals corresponding to different memory accesses from the masters 15 and 16. Besides, the data signal corresponding to the rising edge and the data signal corresponding to the falling edge are independent of each other, and are signals corresponding to the memory accesses from the masters 15 and 16 different from each other.

Figure 2:
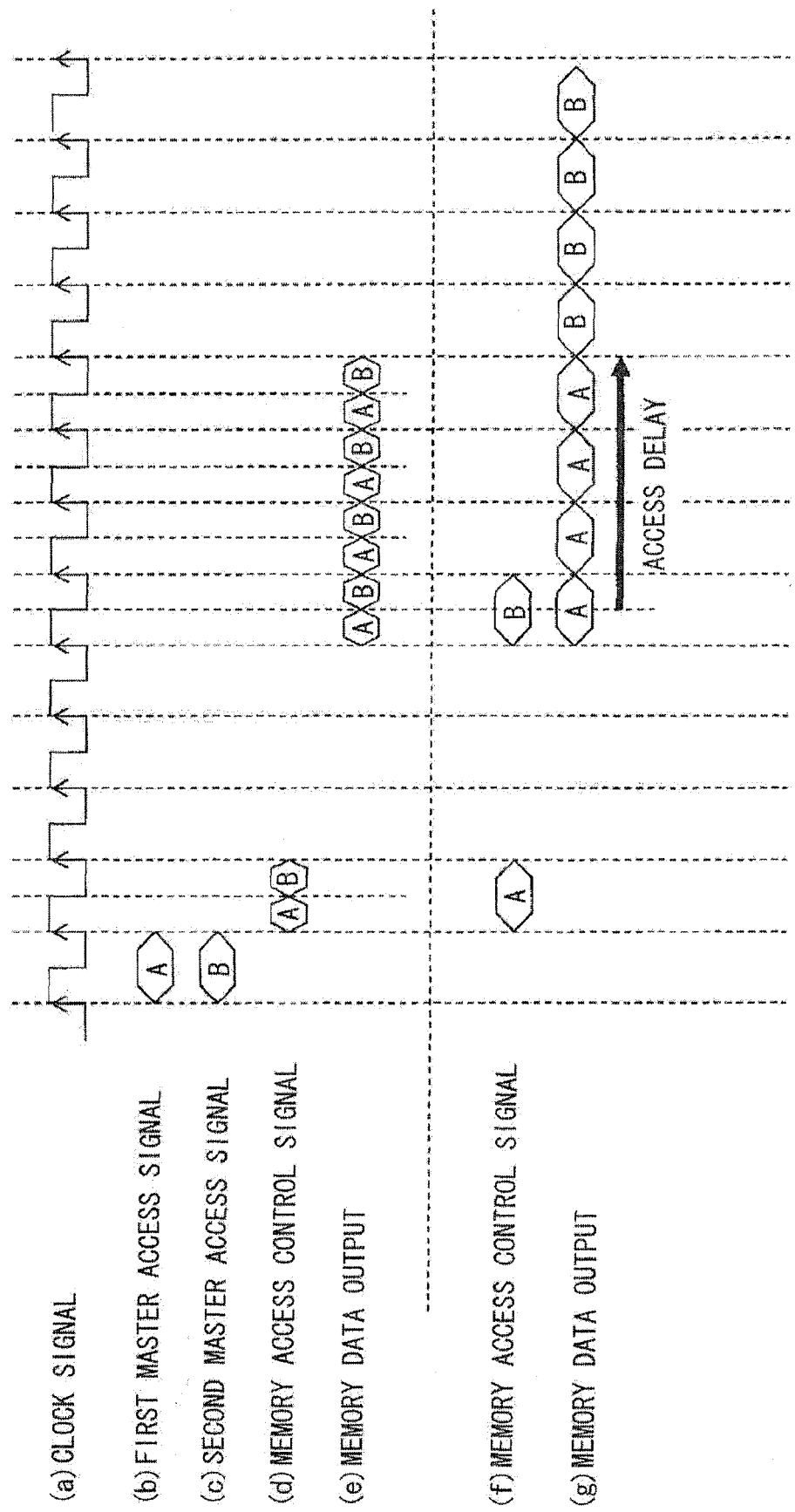
FIG. 2 illustrates a timing chart for explaining the memory read operation of the memory system in FIG. 1.

FIG. 2 illustrates a timing chart for explaining the memory read operation of the memory system 10 in FIG. 1. (a) through (e) in FIG. 2 correspond to the individual signals shown in the memory system 10 in FIG. 1, and the signals (a) through (e) are the clock signal CLK, the access signal of the first master 15, the access signal of the second master 16, the memory access control signal 17 and the memory data output 18, respectively. Here, the access signal of the first master 15 is an access signal which the first master 15 provides to the memory controller 14 in performing the memory access. The access signal of the second master 16 is an access signal which the second master 16 provides to the memory controller 14 in performing the memory access. Incidentally, at (a) through (e), the signals corresponding to the first master 15 are denoted by letter A, while the signals corresponding to the second master 16 are denoted by letter B.

As shown at (b) and (c) in FIG. 2, the access signal A from the first master 15 and the access signal B from the second master 16 are issued at the same clock timing (in the first clock cycle of the clock signal CLK shown at (a) in FIG. 2).

The access signals contain information items indicating the addresses of access destinations and the sorts (read/write) of the accesses.

The memory controller 14 in FIG. 1 determines which of the rising edge and the falling edge the first master 15 and the second master 16 are allotted to, in accordance with the address of access signal A and that of access signal B.

As further shown in FIG. 2, the first master 15 is allotted to the rising edge, and the second master 16 to the falling edge. As a result, as shown at (d) in FIG. 2, the memory access control signal A corresponding to the first master 15 and the memory access control signal B corresponding to the second master 16 are, respectively, output from the memory controller 14 to the control bus 12 in synchronism with the rising edge and falling edge of the clock signal CLK. The memory access control signals A and B correspond to the memory access control signal 17 shown in FIG. 1.

As further shown in FIG. 2, the synchronous memory 11 outputs data after a predetermined latency, in response to the input of the memory access control signal. In the example of FIG. 2, as shown at (e) in FIG. 2, read data appears on the data bus 13 "4" cycles after the assertion of the memory access control signal. In the read data, the memory data output A, corresponding to the first master 15, is synchronous with the rising edge of the clock signal CLK, while the memory data output B, corresponding to the second master 16, is synchronous with the falling edge of the clock signal CLK. The memory data outputs correspond to the data signal 18 shown in FIG. 1. In the example of (e) in FIG. 2, the data read is burst read whose burst length is "4".

(f) and (g) in FIG. 2 show the individual signals of the memory system in the existence of an access delay, and show a memory access control signal and a memory data output, respectively.

As shown at (f) and (g) in FIG. 2, in the case of the burst read of burst length "4", the burst read of data B corresponding to the memory access from the second master 16 may not be started before the burst read of data A corresponding to the memory access from the first master 15 is completed. Accordingly, the memory access delays for a period which corresponds to the length of the burst read.

As shown at (a)-(e) in FIG. 2, during the operation of the memory system 10 in FIG. 1, the memory accesses from the different masters are respectively allotted to the rising edge and the falling edge, and the control signal corresponding to one memory access is synchronized with the rising edge, while the control signal corresponding to the other memory access is synchronized with the falling edge. Besides, the data signal corresponding to one memory access is synchronized with the rising edge, while the data signal corresponding to the other memory access is synchronized with the falling edge. Thus, the memory accesses from the two masters may be processed simultaneously (more exactly, in time-division multiplexing fashion), and the data input/output may be executed concurrently. Accordingly, even in a case where the memory accesses have conflicted, both memory accesses may be processed without a wait time.

Figure 3:
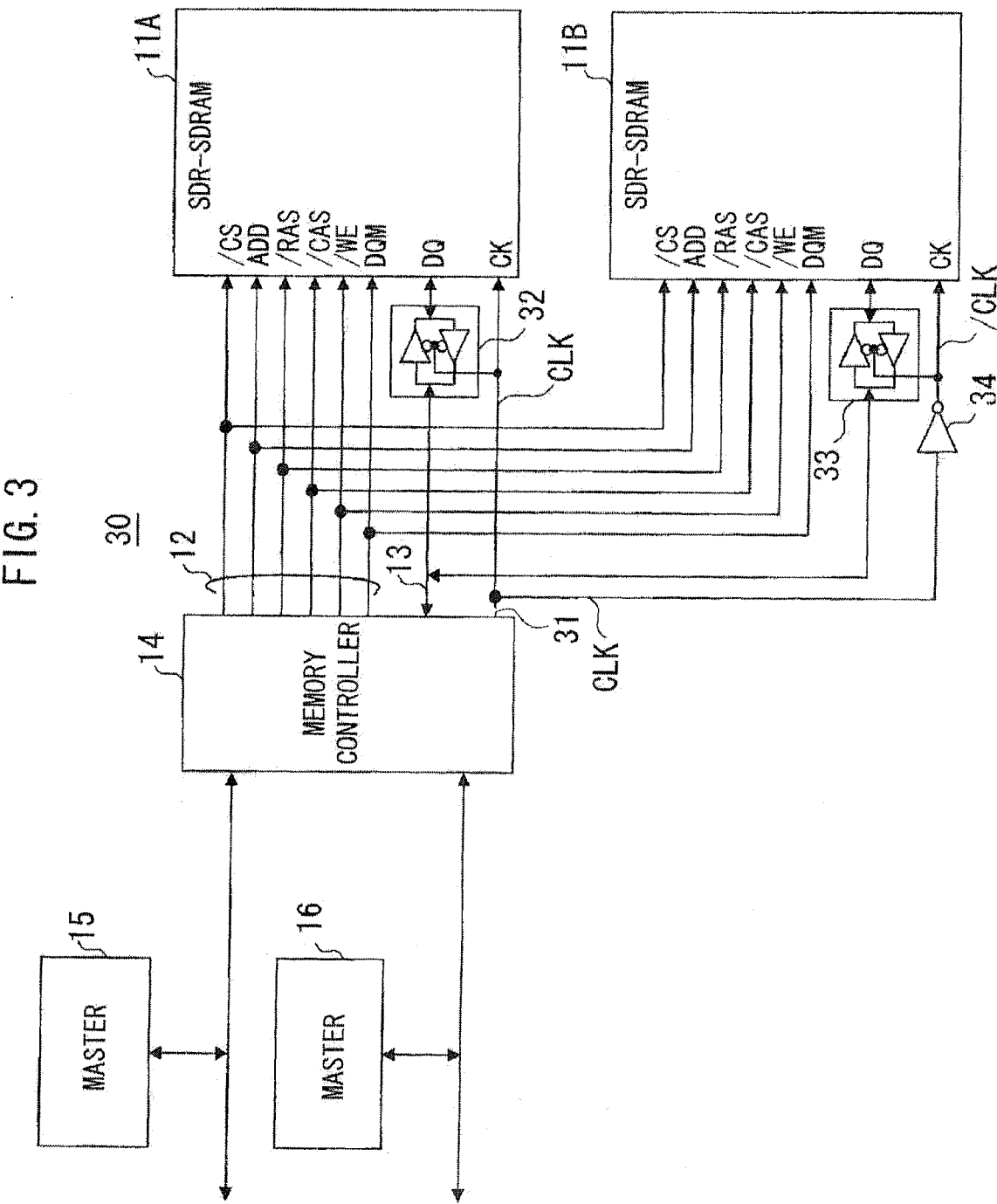
FIG. 3 illustrates an example of the configuration of a memory system according to an exemplary embodiment.

FIG. 3 illustrates an example of the configuration of a memory system according to an embodiment. In FIG. 3, the same constituents as in FIG. 1 are referred to by the same reference numerals and signs and may be omitted from description.

As shown in FIG. 3, the memory system 30 includes an SDR-SDRAM 11A and an SDR-SDRAM 11B which are SDRAMs of SDR (Single Data Rate) type, control buses 12 which are coupled to the SDR-SDRAM 11A and the SDR-SDRAM 11B, a data bus 13 which is coupled to the SDR- SDRAM 11A and the SDR-SDRAM 11B, a clock signal line 31 which is coupled to the SDR-SDRAM 11A and the SDR-SDRAM 11B, a memory controller 14 which is coupled to the control buses 12, the data bus 13 and the clock signal line 31, a first master 15 and a second master 16 which are coupled to the memory controller 14, a gate circuit 32, a gate circuit 33, and an inverter 34.

As further shown in FIG. 3, the synchronous memory 11 in FIG. 1 is incarnated as the SDR-SDRAM 11A and the SDR-SDRAM 11B. The SDR-SDRAM 11A and the SDR-SDRAM 11B are memories which are operated in synchronism with only either of the rising edge and falling edge of a clock signal. In the ensuing description, it shall be assumed that both the SDR-SDRAM 11A and the SDR-SDRAM 11B are operated in synchronism with only the rising edge of the input clock signal. However, the same holds true even under the assumption that the memories are operated in synchronism with only the falling edge of the clock signal.

As further shown in FIG. 3, in the SDR-SDRAM 11A and the SDR-SDRAM 11B, "/CS" denotes a chip enable signal, "ADD" an address signal, "/RAS" a row address strobe signal, "/CAS" a column address strobe signal, "/WE" a write enable signal", "DQM" a byte mask signal, "DQ" an input/output data signal, and "CK" the input clock signal.

As further shown in FIG. 3, the memory controller 14 provides a clock signal CLK in a positive phase state, to the SDR-SDRAM 11A through the clock signal line 31, and it provides a clock signal /CLK in a negative phase state, to the SDR-SDRAM 11B through the clock signal line 31 as well as the inverter 34. Thus, the SDR-SDRAM 11A is operated in synchronism with the rising edge of the clock signal CLK sent from the memory controller 14. Besides, the SDR-SDRAM 11B is operated in synchronism with an edge opposite to the edge with which the SDR-SDRAM 11A is synchronized, that is, in synchronism with the falling edge of the clock signal CLK sent from the memory controller 14.

As further shown in FIG. 3, the gate circuit 32 is coupled between the data bus 13 and the SDR-SDRAM 11A, and it establishes and cuts off the electrical connection between the data bus 13 and the SDR-SDRAM 11A in accordance with the "HIGH" and "LOW" (levels) of the clock signal CLK which is fed to the SDR-SDRAM 11A, respectively. Concretely, when the clock signal CLK to be inputted to the SDR-SDRAM 11A is HIGH, the gate circuit 32 is electrically coupled the data bus 13 and the SDR-SDRAM 11A, and when the clock signal CLK to be inputted to the SDR-SDRAM 11A is LOW, the gate circuit 32 is disabled to electrically cut off the data bus 13 and the SDR-SDRAM 11A.

As further shown in FIG. 3, the gate circuit 33 is coupled between the data bus 13 and the SDR-SDRAM 11B, and it establishes and cuts off the electrical connection between the data bus 13 and the SDR-SDRAM 11B in accordance with the "HIGH" and "LOW" (levels) of the clock signal /CLK which is fed to the SDR-SDRAM 11B, respectively. Concretely, when the inverted clock signal /CLK to be inputted to the SDR-SDRAM 11B is HIGH, the gate circuit 33 is electrically coupled the data bus 13 and the SDR-SDRAM 11B, and when the inverted clock signal /CLK to be inputted to the SDR-SDRAM 11B is LOW, the gate circuit 33 is disabled to electrically cut off the data bus 13 and the SDR-SDRAM 11B.

Thus, the data bus 13 in FIG. 3 is electrically coupled to the SDR-SDRAM 11A for a period corresponding to the rising edge of the clock signal CLK (for the HIGH period of the clock signal CLK), and it is electrically coupled to the SDR-SDRAM 11B for a period corresponding to the falling edge of the clock signal CLK (for the LOW period of the clock signal CLK). On the data bus 13, accordingly, a data input/output (data read/write) operation for the SDR-SDRAM 11A may be executed in synchronism with the rising edge of the clock signal CLK, and a data input/output (data read/write) operation for the SDR-SDRAM 11B may be executed in synchronism with the falling edge of the clock signal CLK.

It is allowed to allot the SDR-SDRAM 11A in FIG. 3, to an address space which corresponds to the first half of the whole address space, and to allot the SDR-SDRAM 11B in FIG. 3, to an address space which corresponds to the second half of the whole address space. In the example of FIG. 3, on condition that either of the access destination of the first master 15 and the access destination of the second master 16 lies within the address space of the first half and that the other lies within the address space of the second half, the memory controller 14 may execute the data read/write operations by simultaneously using the rising edge and the falling edge as stated above. However, when both the access destination of the first master 15 and the access destination of the second master 16 lie within the address space of the identical half, the memory controller 14 preferentially executes either of an access from the first master 15 and an access from the second master 16 in accordance with an arbitration operation.

As a modified embodiment, the SDR-SDRAM 11A in FIG. 3 and the SDR-SDRAM 11B in FIG. 3 may well be allotted to an identical address space in an overlapping shape. In the example of FIG. 3, a memory is so configured that the first master 15 exclusively uses the SDR-SDRAM 11A, while the second master 16 exclusively uses the SDR-SDRAM 11B, and the memory is not shared. Even such a configuration, however, is advantageous in the sense of the decreases of the number of terminals and the number of signal lines.

Figure 4:
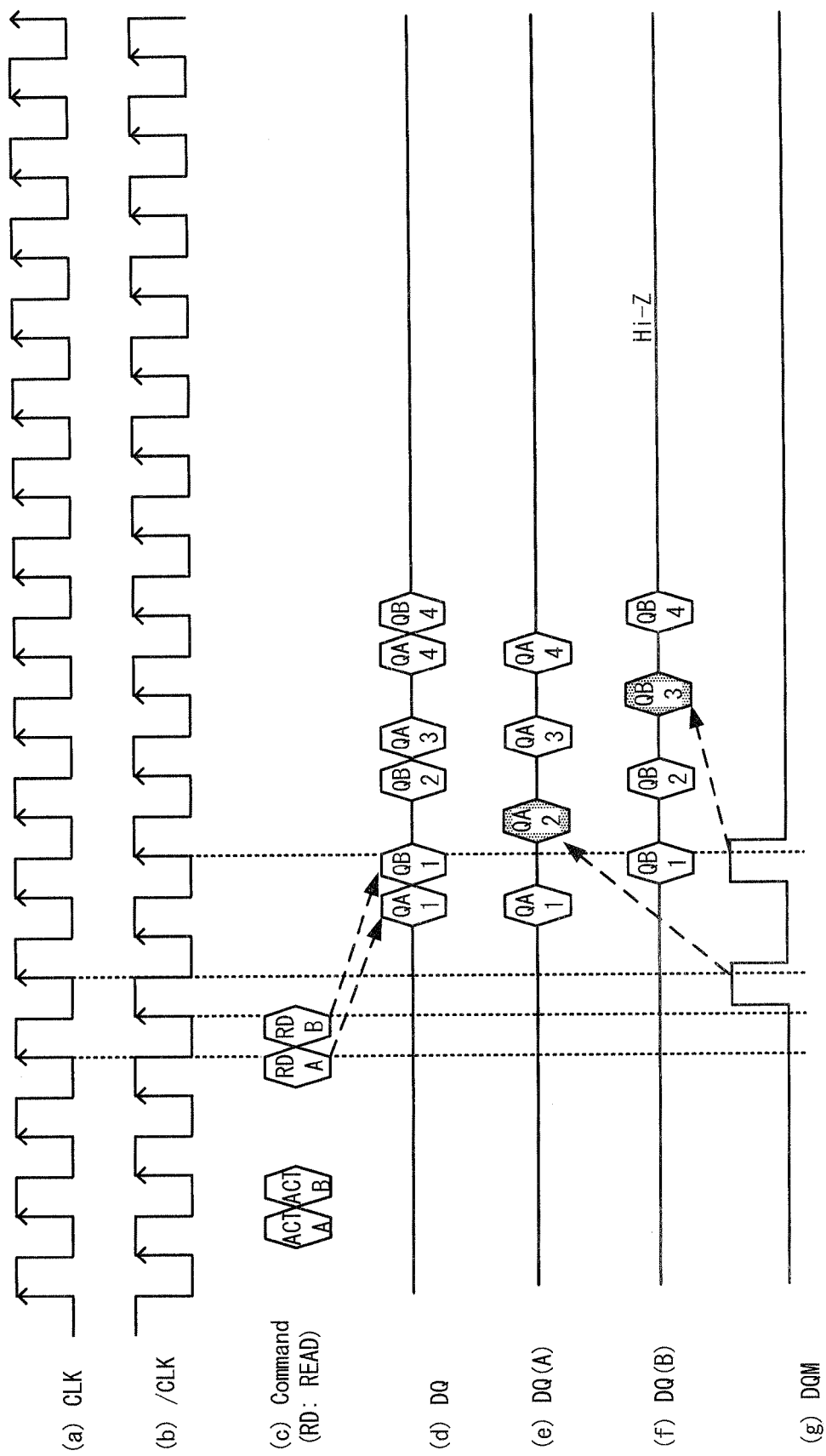
FIG. 4 illustrates a time chart for explaining the read operation of the memory system in FIG. 3.

FIG. 4 illustrates a time chart for explaining the read operation of the memory system 30 in FIG. 3. (a) through (g) in FIG. 4 show the clock signal CLK, the inverted clock signal /CLK, a command "Command" which is inputted to the memory, the read data DQ on the data bus 13, the read data DQ (A) of the SDR-SDRAM 11A in FIG. 3, the read data DQ (B) of the SDR-SDRAM 11B in FIG. 3, and the byte mask signal DQM, respectively. Here, the command "Command" is defined by the combination of the signals /CS, /RAS, /CAS and /WE in FIG. 3.

As shown in FIG. 4, an activation command ACT-A, corresponding to the first master 15, and an activation command ACT-B, corresponding to the second master 16, are output from the memory controller 14 to the control buses 12 in synchronism with the rising edge and falling edge of the clock signal CLK, respectively. Thereafter, a read command READ-A, corresponding to the first master 15, and a read command READ-B, corresponding to the second master 16, are further output from the memory controller 14 in FIG. 3, to the control buses 12 in synchronism with the rising edge and falling edge of the clock signal CLK, respectively.

As further shown in FIG. 4, the SDR-SDRAM 11A in FIG. 3 outputs data after a predetermined latency in response to the inputs of the activation command ACT-A and the read command READ-A. In the example of FIG. 4, as shown as DQ (A) at (e) in FIG. 4, the read data appears after "4" cycles since the input of the activation command ACT-A. The read data QA1 through QA4 correspond to the case of burst read whose burst length is "4", and are synchronous with the rising edges of the clock signal CLK.

As further shown in FIG. 4, the SDR-SDRAM 11B in FIG. 3 outputs data after a predetermined latency in response to the inputs of the activation command ACT-B and the read command READ-B. In the example of FIG. 4, as shown as DQ (B) at (f) in FIG. 4, the read data appears after "4" cycles since the input of the activation command ACT-B. The read data QB1 through QB4 correspond to the case of the burst read whose burst length is "4", and are synchronous with the falling edges of the clock signal CLK.

As further shown in FIG. 4, a mask operation based on the byte mask signal DQM is also executed. When the signal DQM is asserted to "HIGH" by the rising edge of the clock signal CLK, the read data of the SDR-SDRAM 11A in FIG. 3, after a predetermined timing (in the example of FIG. 4, after "2" clock cycles) is masked. Likewise, when the signal DQM is asserted to "HIGH" by the falling edge of the clock signal CLK, the read data of the SDR-SDRAM 11B in FIG. 3, after a predetermined timing (in the example of FIG. 2, after "2" clock cycles) is masked.

As further shown in FIG. 4, data signals read out of the SDR-SDRAM 11A in FIG. 3 and the SDR-SDRAM 11B in FIG. 3 are subjected to time-division multiplexing, and appear on the data bus 13 as shown as "DQ" at (d) in FIG. 4. The memory controller 14 in FIG. 3 provides the first master 15 with the data signals QA1, QA3 and QA4 corresponding to the first master 15, among the data signals on the data bus 13, and it provides the second master 16 with the data signals QB1, QB2 and QB4 corresponding to the second master 16.

Figure 5:
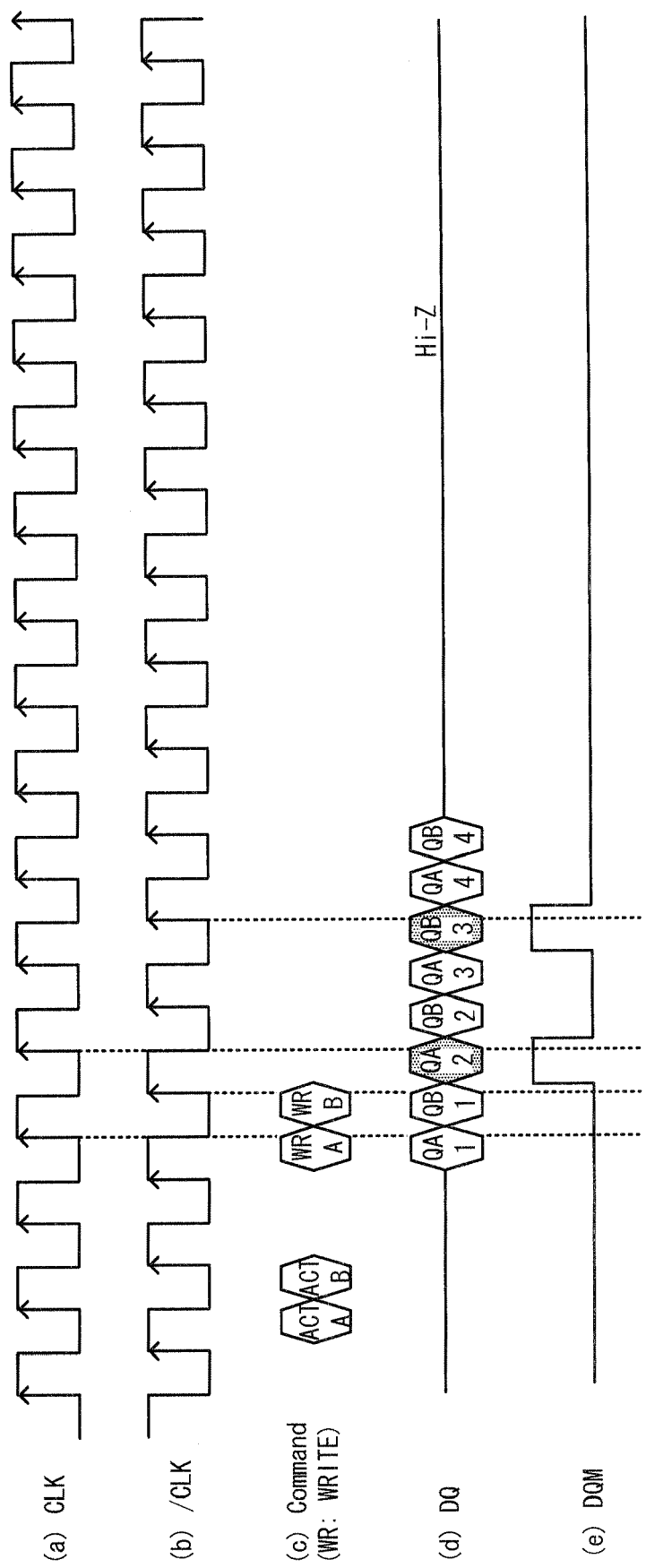
FIG. 5 illustrates a time chart for explaining the write operation of the memory system in FIG. 3.

FIG. 5 illustrates a time chart for explaining the write operation of the memory system 30 in FIG. 3. (a) through (e) in FIG. 5 show the clock signal CLK, the inverted clock signal /CLK, a command "Command" which is inputted to the memory, a write data DQ on the data bus 13, and the byte mask signal DQM, respectively. Here, the command "Command" is defined by the combination of the signals /CS, /RAS, /CAS and /WE in FIG. 3.

As shown in FIG. 5, an activation command ACT-A corresponding to the first master 15 and an activation command ACT-B corresponding to the second master 16 are output from the memory controller 14 in FIG. 3, to the control buses 12 in synchronism with the rising edge and falling edge of the clock signal CLK, respectively. Thereafter, a write command WRITE-A corresponding to the first master 15 and a write command WRITE-B corresponding to the second master 16 are further output from the memory controller 14 to the control buses 12 in synchronism with the rising edge and falling edge of the clock signal CLK, respectively.

As further shown in FIG. 5, at the same time that the write command WRITE-A is asserted, the memory controller 14 outputs write data into the SDR-SDRAM 11A in FIG. 3, to the data bus 13. The write data QA1 through QA4 correspond to the case of burst write whose burst length is "4", and are synchronous with the rising edges of the clock signal CLK. Likewise, at the same time that the write command WRITE-B is asserted, the memory controller 14 in FIG. 3 outputs write data into the SDR-SDRAM 11B in FIG. 3, to the data bus 13. The write data QB1 through QB4 correspond to the case of the burst write whose burst length is "4", and are synchronous with the falling edges of the clock signal CLK.

As further shown in FIG. 5, a mask operation based on the byte mask signal DQM is also executed. When the signal DQM is asserted to "HIGH" by the rising edge of the clock signal CLK, the write data into the SDR-SDRAM 11A in FIG. 3, at that timing is masked. Likewise, when the signal DQM is asserted to "HIGH" by the falling edge of the clock signal CLK, the write data into the SDR-SDRAM 11B in FIG. 3, at that timing is masked.

Figure 6:
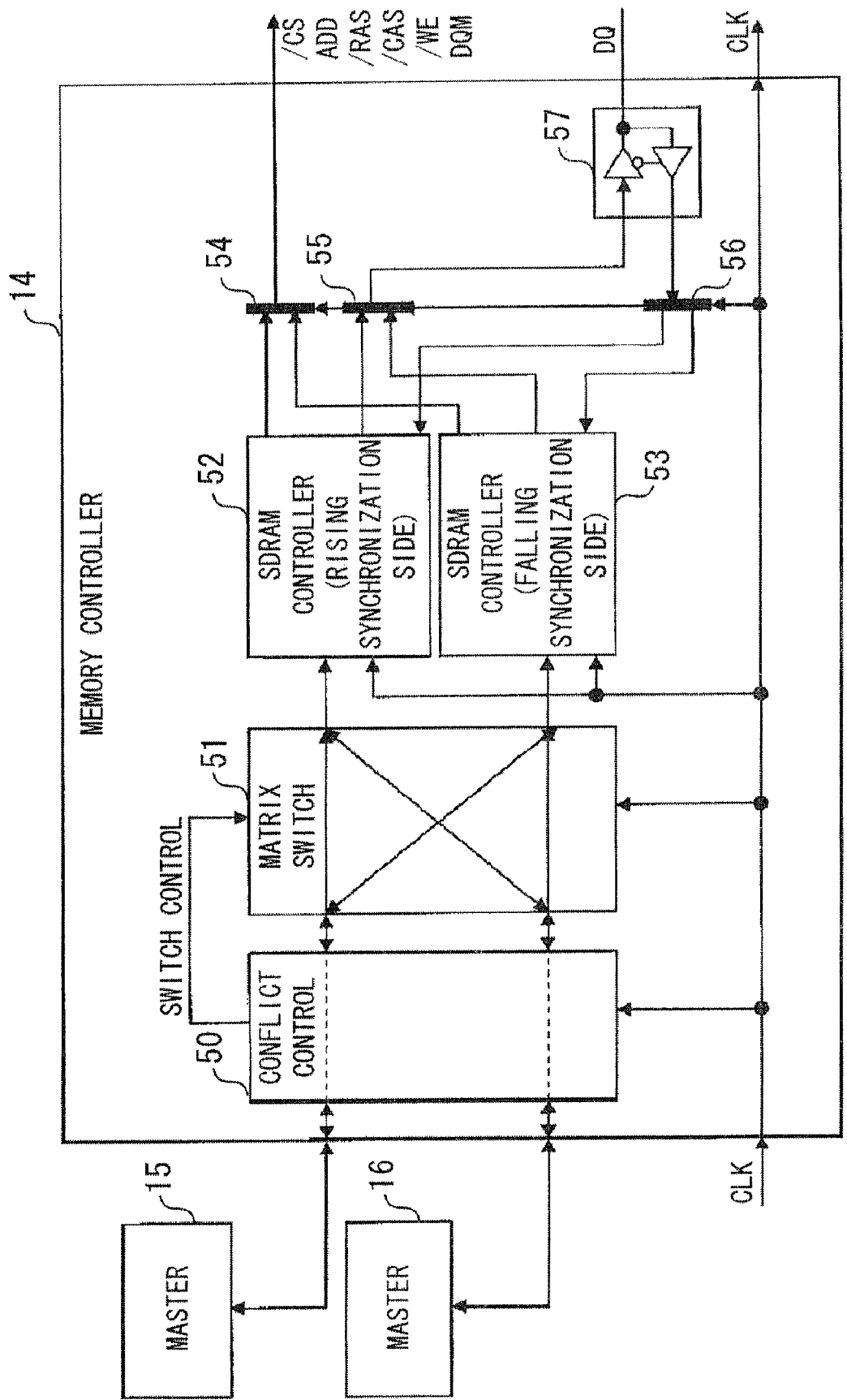
FIG. 6 illustrates an example of the configuration of a memory controller in FIG. 3.

FIG. 6 illustrates an example of the configuration of the memory controller 14 in FIG. 3.

As shown in FIG. 6, the memory controller 14 includes a conflict control unit 50, a matrix switch 51, an SDRAM controller 52, an SDRAM controller 53, a selector 54, a selector 55, a selector 56, and an input/output buffer 57. The SDRAM controller 52 is a controller which controls the operation of processing synchronous with the rising edge, while the SDRAM controller 53 is a controller which controls the operation of processing synchronous with the falling edge. Each of the selectors 54, 55 and 56 selects one of two inputs in accordance with the "HIGH" or "LOW" of the clock signal CLK and delivers an output to an output terminal. In this way, it may be permitted to transmit and receive the control signals and data signals of the SDRAM controllers 52 and 53 as are respectively synchronous with the rising edge and the falling edge.

As further shown in FIG. 6, the conflict control unit 50 determines which of the first master 15 and the second master 16 is allotted to a rising edge side, and which is allotted to a falling edge side, in accordance with the address of a memory access from the first master 15 and the address of a memory access from the second master 16.

As further shown in FIG. 6, the matrix switch 51 switches the signal paths of its internal matrix in accordance with switch control signals indicating the result of the determination based on the conflict control unit 50, so as to allot the first master 15 to one of the rising edge and the falling edge and to allot the second master 16 to the other of the rising edge and the falling edge. Thus, the first master 15 is coupled to either the SDRAM controller 52 or the SDRAM controller 53, and the second master 16 is coupled to the other SDRAM controller.

As further shown in FIG. 6, it is allowed that the memory that the SDRAM controller 52 controls (the SDR-SDRAM 11A in FIG. 3) is allotted to the address space corresponding to the first half of the whole address space, while the memory that the SDRAM controller 53 controls (the SDR-SDRAM 11B in FIG. 3) is allotted to the address space corresponding to the second half of the whole address space. When one of the access destination of the first master 15 and the access destination of the second master 16 lies within the address space of the first half and where the other lies within the address space of the second half, the conflict control unit 50 allots the first master 15 and the second master 16 to the rising edge and the falling edge, respectively, as stated above. However, when both the access destination of the first master 15 and the access destination of the second master 16 lie within the address space of the same half, the conflict control unit 50 preferentially allots either of the access from the first master 15 and the access from the second master 16 to the DRAM controller corresponding to the access destination, in accordance with the arbitration operation.

Figure 7:
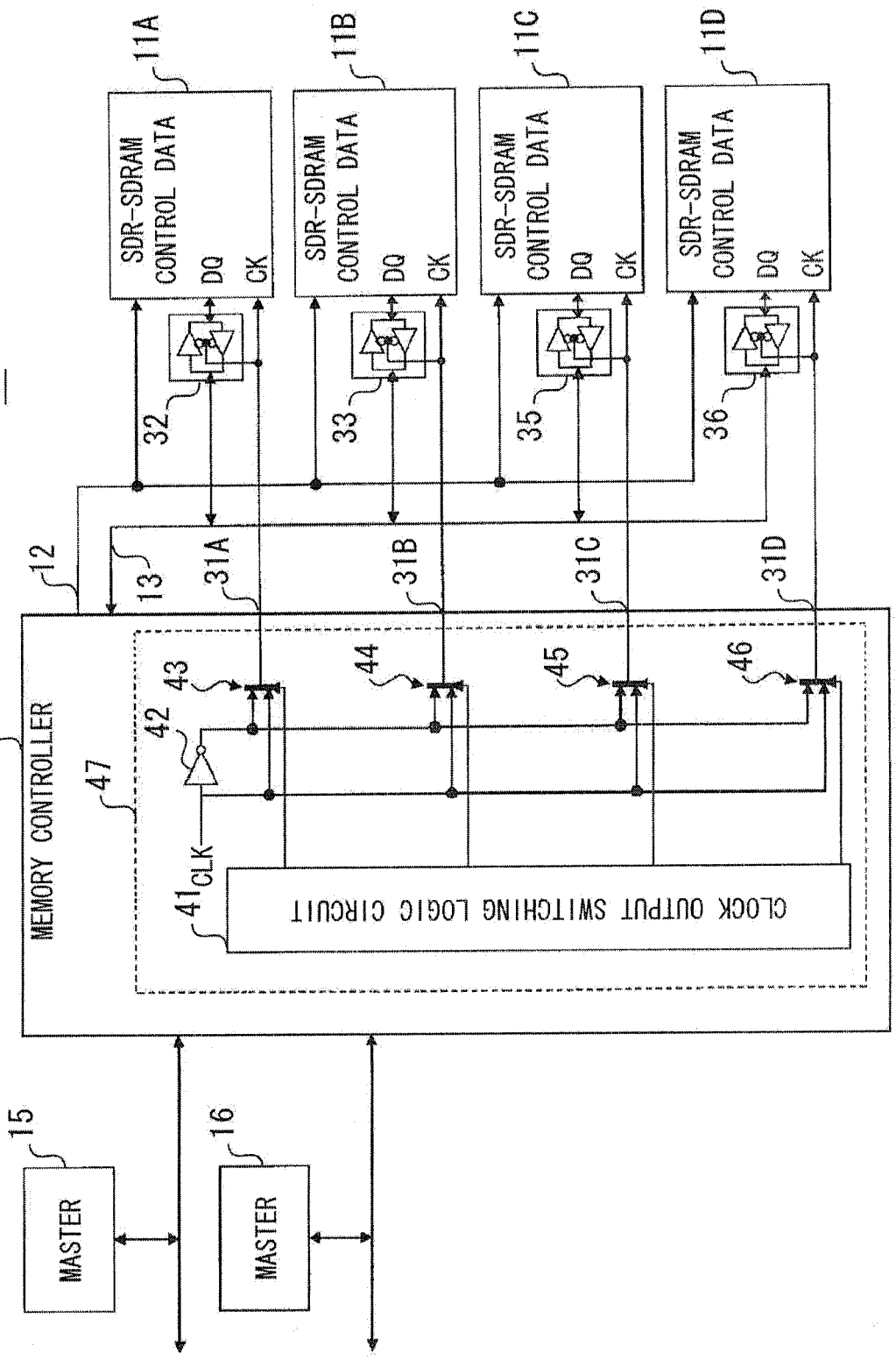
FIG. 7 illustrates an example of the configuration of a memory system according to another embodiment.

FIG. 7 illustrates an example of the configuration of a memory system according to another embodiment. In FIG. 7, the same constituents as in FIG. 1 and FIG. 3 are referred to by the same reference numerals and signs and may be omitted from description. Incidentally, a memory controller 14A in FIG. 7 may be configured by adding a circuit unit 47 shown in FIG. 7 to the memory controller 14 in FIG. 6.

As shown in FIG. 7, the memory system 40 includes an SDR-SDRAM 11A, an SDR-SDRAM 11B, an SDR-SDRAM 11C and an SDR-SDRAM 11D which are SDRAMs of SDR (Single Data Rate) type, a control bus 12 which is coupled to the SDR-SDRAMs 11A through 11D, a data bus 13 which is coupled to the SDR-SDRAMs 11A through 11D, clock signal lines 31A through 31D which are respectively coupled to the SDR-SDRAMs 11A through 11D, the memory controller 14A which is coupled to the control bus 12, the data bus 13 and the clock signal lines 31A through 31D, a first master 15 and a second master 16 which are coupled to the memory controller 14A, and gate circuits 32, 33, 35 and 36.

As further shown in FIG. 7, the synchronous memory 11 in FIG. 1 is incarnated as the SDR-SDRAMs 11A through 11D. The SDR-SDRAM 11A through 11D are memories that are operated in synchronism with only one of the rising edge and the falling edge of a clock signal. In the ensuing description, it shall be assumed that all the SDR-SDRAMs 11A through 11D are operated in synchronism with only the rising edge of the input clock signal. However, the same holds true even under the assumption that the memories are operated in synchronism with only the falling edge of the clock signal.

As further shown in FIG. 7, the memory controller 14A includes a clock output switching logic circuit 41, an inverter 42, and selectors 43 through 46. Each of the selectors 43 through 46 is supplied with the clock signal CLK, and an inverted clock signal /CLK into which the clock signal CLK has been inverted by the inverter 42. Besides, each of the selectors 43 through 46 selects and outputs either designated one of the clock signal CLK and the inverted clock signal /CLK in accordance with a control signal from the clock output switching logic circuit 41. In a case where neither of the clock signal and the inverted clock signal is designated, each of the selectors 43 through 46 brings its output into a fixed state of "HIGH" or "LOW".

As further shown in FIG. 7, the clock signal CLK or the inverted clock signal /CLK in a positive phase state is fed to the SDR-SDRAMs 11A through 11D, through the respective clock signal lines 31A through 31D. Thus, each of the SDR-SDRAMs 11A through 11D is operated in synchronism with the rising edge of the clock signal fed from the memory controller 14A. Whether each of the SDR-SDRAMs 11A through 11D is operated in synchronism with the rising edge of the clock signal CLK or in synchronism with the falling edge thereof, depends upon which of the clock signals the corresponding one of the selectors 43 through 46 selects and outputs.

As further shown in FIG. 7, each of the gate circuits 32, 33, 35 and 36 establishes or cuts off the electrical connection between the data bus 13 and the corresponding SDR-SDRAM, in accordance with the "HIGH" or "LOW" of the clock signal which is fed to the corresponding SDR-SDRAM. Concretely, when the clock signal to be inputted to the SDR-SDRAM is "HIGH", the gate circuit is electrically coupled the data bus 13 and the SDR-SDRAM, and when the clock signal to be inputted to the SDR-SDRAM is "LOW", the gate circuit is disabled to electrically cut off the data bus 13 and the SDR-SDRAM.

In the aforementioned other embodiment in FIG. 7, the memory controller 14A may provide the clock signal CLK to a selected one of the four SDR-SDRAMs 11A through 11D, so as to electrically couple the selected SDR-SDRAM to the data bus 13 for the "HIGH" period of the clock signal CLK and to detach the selected SDR-SDRAM from the data bus 13 for the "LOW" period of the clock signal CLK. Besides, the memory controller 14A may provide the inverted clock signal /CLK to a selected one of the four SDR-SDRAMs 11A through 11D, so as to electrically couple the selected SDR-SDRAM to the data bus 13 for the "LOW" period of the clock signal CLK and to detach the selected SDR-SDRAM from the data bus 13 for the "HIGH" period of the clock signal CLK. Further, the memory controller 14A prevents the remaining two SDR-SDRAMs from being operated, by fixing the clock signal to "HIGH" or "LOW". On the data bus 13, accordingly, a data input/output (data read/write) operation for the first selected SDR-SDRAM may be executed in synchronism with the rising edge of the clock signal CLK, while a data input/output (data read/write) operation for the second selected SDR-SDRAM may be executed in synchronism with the falling edge of the clock signal CLK.

In the aforementioned other embodiment in FIG. 7, each of the four SDR-SDRAMs 11A through 11D may be allotted to a corresponding ¼ address space within the whole address space. In the example of FIG. 7, in a case where one of the access destination of the first master 15 and the access destination of the second master 16 lies within any ¼ address space and where the other lies within another ¼ address space, the memory controller 14A may execute the data read/write operations by simultaneously using the rising edge and the falling edge as stated above. However, when both the access destination of the first master 15 and the access destination of the second master 16 lie within the same ¼ address space, the memory controller 14A preferentially executes either of an access from the first master 15 and an access from the second master 16 in accordance with an arbitration operation. The number of the independent memories is larger in the configuration of FIG. 7 than in that of FIG. 3, so that a probability at which the preference of either of the first master 15 and the second master 16 by the arbitration operation is required may be lowered.

Figure 8:
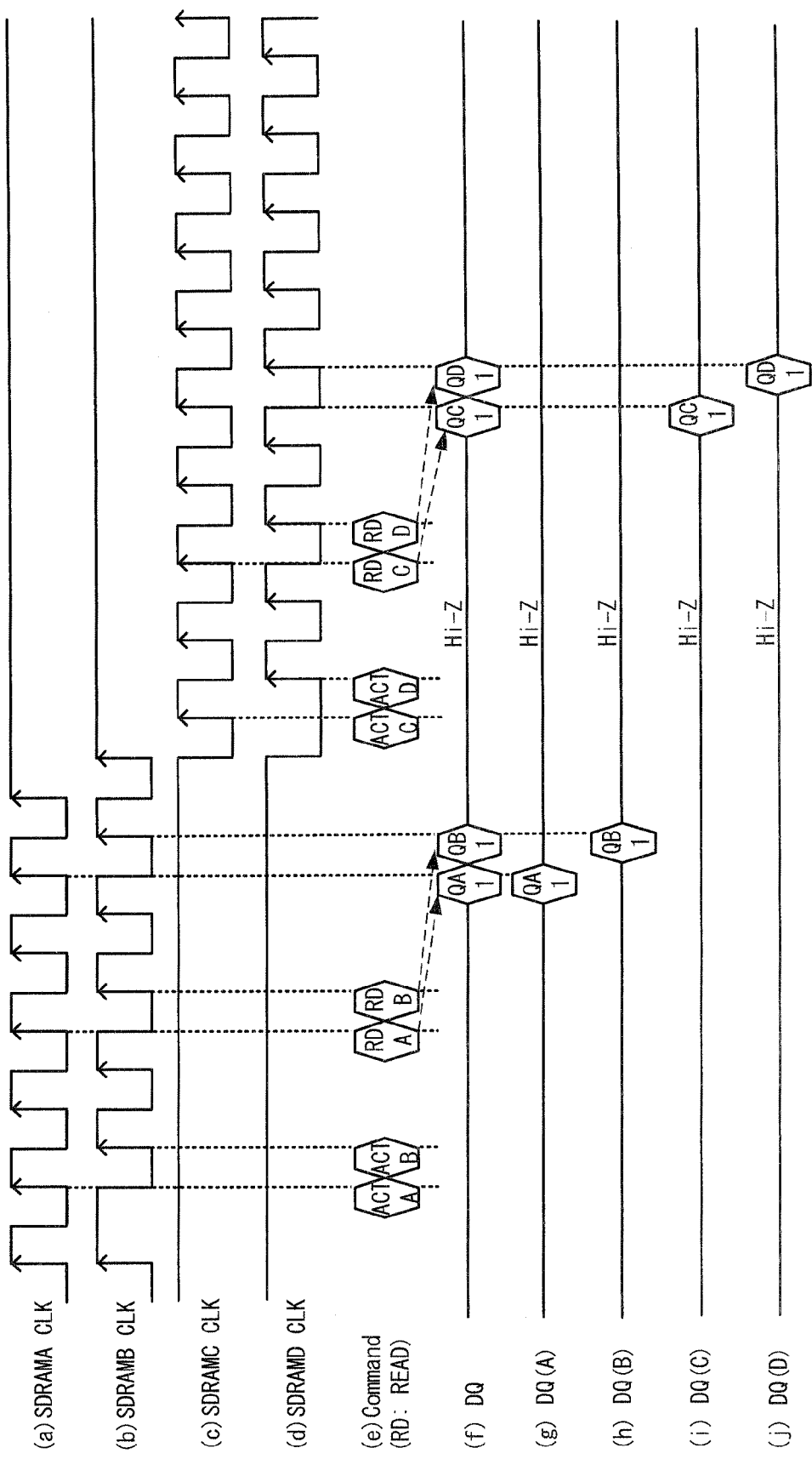
FIG. 8 illustrates a time chart for explaining the read operation of the memory system in FIG. 7.

FIG. 8 illustrates a time chart for explaining the read operation of the memory system 40 in FIG. 7. (a) through (j) in FIG. 8 show a clock signal SDRAMA-CLK to the SDR-SDRAM 11A, a clock signal SDRAMB-CLK to the SDR-SDRAM 11B, a clock signal SDRAMC-CLK to the SDR-SDRAM 11C, a clock signal SDRAMD-CLK to the SDR-SDRAM 11D, a command "Command" which is inputted to the memory, read data DQ on the data bus 13, read data DQ (A) from the SDR-SDRAM 11A, read data DQ (B) from the SDR-SDRAM 11B, read data DQ(C) from the SDR-SDRAM 11C, and read data DQ (D) from the SDR-SDRAM 11D, respectively. Here, the command "Command" is defined by the combination of control signals which are fed from the control bus 12.

As shown in FIG. 8, in the initial state of the memory system 40, the SDRAMA-CLK is set at the clock signal of positive phase, the SDRAMB-CLK is set at the inverted clock signal, the SDRAMC-CLK is fixed to "HIGH", and the SDRAMD-CLK is fixed to "HIGH". In initial state, as shown at (e) in FIG. 8, an activation command ACT-A, corresponding to the first master 15, and an activation command ACT-B, corresponding to the second master 16, are, respectively, output from the memory controller 14A to the control bus 12 in synchronism with the rising edge and falling edge of the clock signal SDRAMA-CLK. Thereafter, a read command READ-A, corresponding to the first master 15, and a read command READ-B, corresponding to the second master 16, are further output from the memory controller 14A to the control bus 12 in synchronism with the rising edge and falling edge of the clock signal SDRAMA-CLK, respectively.

As further shown in FIG. 8, the SDR-SDRAM 11A outputs data after a predetermined latency in response to the inputs of the activation command ACT-A and the read command READ-A. In the example of FIG. 8, as shown as DQ (A) at (g) in FIG. 8, the read data appears after "4" cycles since the input of the activation command ACT-A. The read data QA1 is synchronous with the rising edge of the clock signal SDRAMA-CLK.

As further shown in FIG. 8, the SDR-SDRAM 11B outputs data after a predetermined latency in response to the inputs of the activation command ACT-B and the read command READ-B. In the example of FIG. 8, as shown as DQ (B) at (h) in FIG. 8, the read data appears after "4" cycles since the input of the activation command ACT-B. The read data QB1 is synchronous with the rising edge of the clock signal SDRAMB-CLK (the falling edge of the clock signal SDRAMA-CLK).

As shown as "DQ" at (f) in FIG. 8, data signals read out of the SDR-SDRAM 11A and the SDR-SDRAM 11B are subjected to time-division multiplexing, and appear on the data bus 13. The memory controller 14A in FIG. 7 provides the first master 15 with the data signal QA1 corresponding to the first master 15, in the data signals on the data bus 13, and it provides the second master 16 with the data signal QB1 corresponding to the second master 16.

As further shown in FIG. 8, the signal SDRAMA-CLK is fixed to "HIGH", the signal SDRAMB-CLK is fixed to "HIGH", the signal SDRAMC-CLK is set at the clock signal of positive phase, and the signal SDRAMD-CLK is set at the inverted clock signal. In the above-described state, as shown at (e) in FIG. 8, an activation command ACT-C, corresponding to the first master 15, and an activation command ACT-D, corresponding to the second master 16, are, respectively, output from the memory controller 14A to the control bus 12 in synchronism with the rising edge and falling edge of the clock signal SDRAMC-CLK. Thereafter, a read command READ-C, corresponding to the first master 15, and a read command READ-D, corresponding to the second master 16, are further output from the memory controller 14A to the control bus 12 in synchronism with the rising edge and falling edge of the clock signal SDRAMC-CLK, respectively.

As further shown in FIG. 8, the SDR-SDRAM 11C outputs data after a predetermined latency in response to the inputs of the activation command ACT-C and the read command READ-C. In the example of FIG. 8, as shown as DQ(C) at (i) in FIG. 8, the read data appears after "4" cycles since the input of the activation command ACT-C. The read data QC1 is synchronous with the rising edge of the clock signal SDRAMC-CLK.

As further shown in FIG. 8, the SDR-SDRAM 11D outputs data after a predetermined latency in response to the inputs of the activation command ACT-D and the read command READ-D. In the example of FIG. 8, as shown as DQ (D) at (j) in FIG. 8, the read data appears after "4" cycles since the input of the activation command ACT-D. The read data QD1 is synchronous with the rising edge of the clock signal SDRAMD-CLK (the falling edge of the clock signal SDRAMC-CLK).

As shown as "DQ" at (f) in FIG. 8, data signals read out of the SDR-SDRAM 11C and the SDR-SDRAM 11D are subjected to time-division multiplexing, and appear on the data bus 13. The memory controller 14A in FIG. 7 provides the first master 15 with the data signal QC1, corresponding to the first master 15, in the data signals on the data bus 13, and it provides the second master 16 with the data signal QD1, corresponding to the second master 16.

In the configuration of FIG. 7, each of the gate circuits 32, 33, 35 and 36 has had its enabling/disabling controlled by the corresponding clock signal, but a corresponding control signal may well be set as a signal independent of the clock signal and be fed from the memory controller 14A to each gate circuit, the enabling/disabling of which is controlled by the control signal.

In the configuration of FIG. 7, as further shown in FIG. 8, any non-selected memory need not be stopped by fixing the clock signal to "HIGH" or "LOW", but the data bus 13 may be freely detached from the non-selected memory by the above control signal while the clock signal is being fed to the non-selected memory. Any selected memory being a subject for a data access may be operated similarly to the selected memory shown in FIG. 8, by changing the above control signal to "HIGH" or "LOW" in synchronism with the clock signal.

Figure 9:
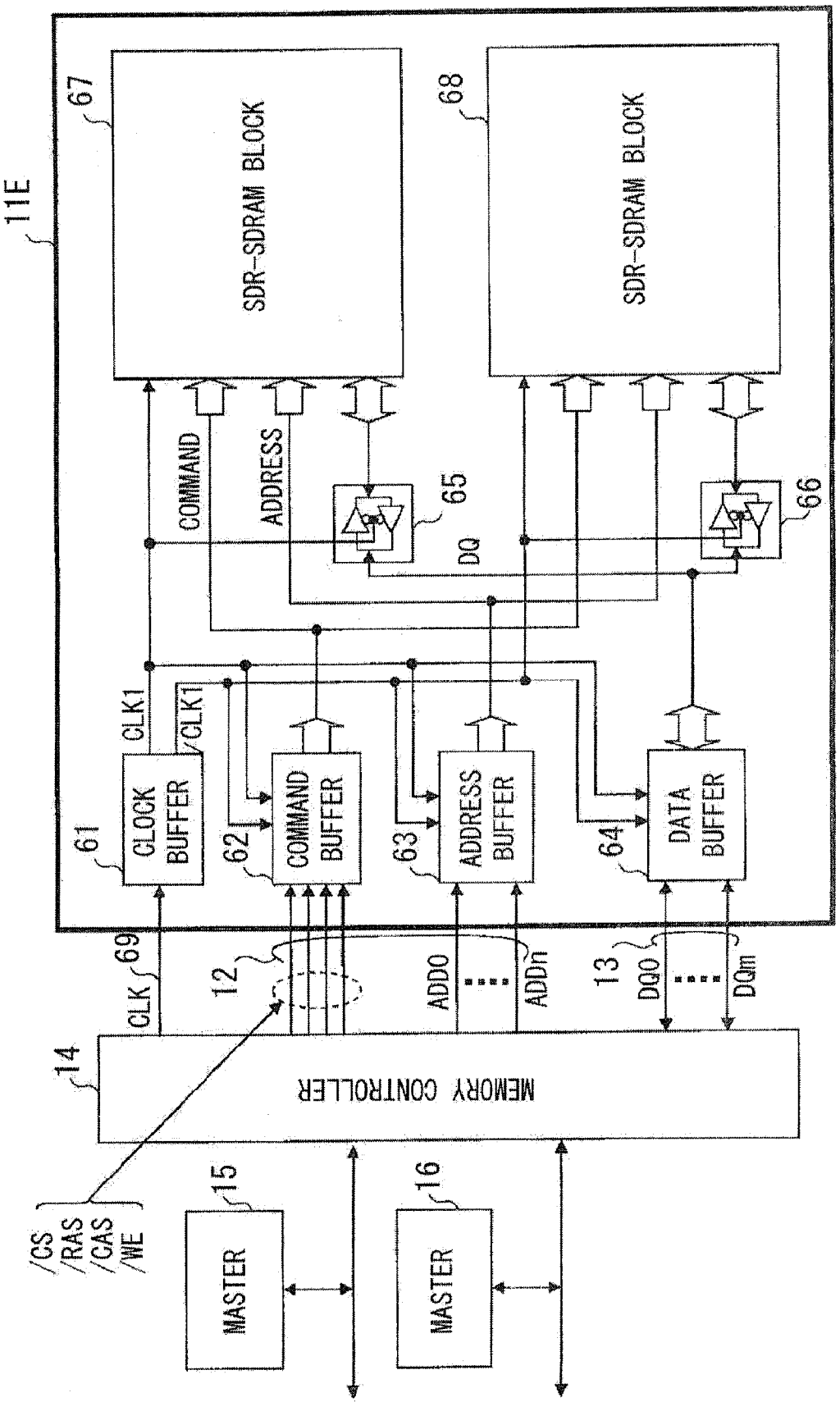
FIG. 9 illustrates an example of the configuration of a memory system according to another embodiment.

FIG. 9 illustrates an example of the configuration of a memory system according to another embodiment. In FIG. 9, the same constituents as in FIG. 1 are referred to by the same numerals and signs and may be omitted from description.

In the memory system 30 in FIG. 9, the synchronous memory 11 in FIG. 1 is incarnated as an SDRAM 11E of single chip. The SDRAM 11E is a memory which is operated in synchronism with both the rising edge and falling edge of a clock signal.

The SDRAM 11E in FIG. 9 includes a clock buffer 61, a command buffer 62, an address buffer 63, a data buffer 64, a gate circuit 65, a gate circuit 66, an SDR-SDRAM block 67, and an SDR-SDRAM block 68.

As shown in FIG. 9, the clock buffer 61 receives the clock signal CLK which is fed from a memory controller 14 through a clock signal line 69, and it outputs a clock signal CLK1 of positive phase and a clock signal /CLK1 of negative phase (inverted). The clock signal CLK1 is fed to the SDR-SDRAM block 67, and the clock signal /CLK1 is fed to the SDR-SDRAM block 68. The SDR-SDRAM blocks 67 and 68 are memory blocks which are operated in synchronism with either of the rising edge and the falling edge. In the ensuing description, it shall be assumed that the SDR-SDRAM blocks 67 and 68 are operated in synchronism with the rising edge. However, the same holds true even under the assumption that the memory blocks are operated in synchronism with the falling edge.

As further shown in FIG. 9, the command buffer 62 receives control signals through control buses 12, and it concurrently provides the SDR-SDRAM blocks 67 and 68 with commands corresponding to the control signals. The address buffer 63 receives address signals through the control buses 12, and it concurrently provides the SDR-SDRAM blocks 67 and 68 with the address signals.

As further shown in FIG. 9, the data buffer 64 is interposed between data buses 13 and the SDR-SDRAM blocks 67 and 68, and it inputs/outputs data from/to the data buses 13. The gate circuit 65 is coupled between the data buffer 64 and the SDR-SDRAM block 67, and it establishes or cuts off the electrical connection between the data buffer 64 and the SDR-SDRAM block 67, in accordance with the "HIGH" or "LOW" of the clock signal CLK1. Besides, the gate circuit 66 is coupled between the data buffer 64 and the SDR-SDRAM block 68, and it establishes or cuts off the electrical connection between the data buffer 64 and the SDR-SDRAM block 68, in accordance with the "HIGH" or "LOW" of the clock signal /CLK1.

In the aforementioned embodiment in FIG. 9, the single clock buffer 61, the single command buffer 62, the single address buffer 63 and the single data buffer 64 are disposed for the SDR-SDRAM blocks 67 and 68 which are operated in synchronism with the rising edge, and the electrical connections between the data buffer 64 and the individual SDR-SDRAM blocks 67 and 68 are respectively controlled by the gate circuits 65 and 66. Thus, it may be possible to provide the SDRAM 11E which may execute memory access operations independent of each other, in synchronism with the rising edge and falling edge of the clock signal CLK. Read and write operations shall be omitted from description because are the same as the operations of the configuration shown in FIG. 3, except that the SDR-SDRAM block 67 is employed instead of the SDR-SDRAM 11A and that the SDR-SDRAM block 68 is employed instead of the SDR-SDRAM 11B.

In the aforementioned embodiments, control signals corresponding to a memory access from one master are synchronized with a rising edge, while control signals corresponding to a memory access from the other master are synchronized with a falling edge. Also, data signals corresponding to one memory access are synchronized with the rising edge, while data signals corresponding to the other memory access are synchronized with the falling edge. Thus, it is permitted to process memory access from the two masters simultaneously (more exactly, in time-division multiplexing fashion), and data input/output may be executed concurrently. Accordingly, when an external memory is shared by a plurality of masters, the increase of a latency may be suppressed in a case where the conflict of accesses to the external memory has occurred.

The many features and advantages of the embodiments are apparent from the detailed specification and, thus, it is intended by the appended claims to cover all such features and advantages of the embodiments that fall within the true spirit and scope thereof. It will be appreciated that these examples are merely illustrative of aspects of the embodiment. Many variations and modifications will be apparent to those skilled in the art. As numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A semiconductor integrated circuit comprising:
   a control terminal coupled to a memory through a control bus;
   a data terminal coupled to the memory through a data bus;
   a memory controller coupled to the control terminal and the data terminal; and
   a first master and a second master coupled to the memory controller;
   wherein the memory controller supplies a control signal corresponding to a memory access based on the first master in synchronism with one of a rising edge and a falling edge of a clock signal and a control signal corresponding to a memory access based on the second master to the control terminal in synchronism with the other of the rising edge and the falling edge of the clock signal, and the memory controller receives and outputs input/output data of the first master and input/output data of the second master at the data terminal in synchronism with one of the rising edge and the falling edge of the clock signal.

2. The semiconductor integrated circuit according to claim 1, wherein the memory controller is capable of switching the supply of control signals between the rising edge and the falling edge of the clock signal.

3. The semiconductor integrated circuit according to claim 2, wherein the memory controller comprises:
   a conflict control unit determining a switch of the rising edge and the falling edge of the clock signal, in accordance with an address of the memory access based on the first master and an address of the memory access based on the second master; and
   a switching unit allotting the first master to one of the rising edge and the falling edge and allotting the second master to the other of the rising edge and the falling edge, in accordance with a result of the determination of the conflict control unit.

4. A memory system comprising:
   a memory, wherein the memory is operated in synchronism with a clock signal;
   a control bus coupled to the memory;
   a data bus coupled to the memory;
   a memory controller coupled to the control bus and the data bus; and
   a first master and a second master coupled to the memory controller;
   wherein the memory controller supplies a control signal corresponding to a memory access based on the first master in synchronism with one of a rising edge and a falling edge of the clock signal and a control signal corresponding to a memory access based on the second master to the control bus in synchronism with the other of the rising edge and the falling edge of the clock signal, and
   the memory controller receives and outputs input/output data of the first master and input/output data of the second master at the data bus in synchronism with one of the rising edge and the falling edge of the clock signal.

5. The memory system according to claim 4, wherein the memory controller is capable of switching the control signals between the rising edge and the falling edge of the clock signal.

6. The memory system according to claim 4, wherein the memory controller comprises:
   a conflict control unit determining a switch between the rising edge and the falling edge of the clock signal in accordance with an address of the memory access based on the first master and an address of the memory access based on the second master; and
   a switching unit allotting the first master to one of the rising edge and the falling edge and allotting the second master to the other of the rising edge and the falling edge of the clock signal in accordance with a result of the determination of the conflict control unit.

7. The memory system according to claim 4, wherein the memory includes a first memory and a second memory operated in synchronism with an identical edge, wherein the edge is one of the rising edge and the falling edge of the clock signal, the memory system further comprising:
   a signal provide circuit providing the clock signal to the first memory during a positive phase state and providing the clock signal to the second memory during a negative phase state;
   a first gate coupled between the data bus and the first memory, wherein the first gate establishes or cuts off an electrical connection between the data bus and the first memory, when the clock signal is in the positive phase state; and
   a second gate coupled between the data bus and the second memory, wherein the second gate establishes or cuts off an electrical connection between the data bus and the second memory, when the clock signal is in the negative phase state.

8. The memory system according to claim 7, wherein the first memory and the second memory are allotted to an identical address space.

9. The memory system according to claim 7,
   wherein the memory further includes a third memory operated in synchronism with an identical edge being either of the rising edge and the falling edge of the clock signal, the memory system further comprising:
   a signal provide circuit providing one selected from a group consisting of the clock signal of positive phase state and the clock signal of negative phase state to the third memory; and
   a third gate coupled between the data bus and the third memory, wherein the third gate establishes or cuts off an electrical connection between the data bus and the third memory, in accordance with the selected clock signal.

10. The memory system according to claim 7, wherein the memory comprises:
a first memory circuit and a second memory circuit operated in synchronism with an identical edge, the identical edge being one of the rising edge and the falling edge of the clock signal;
a single command buffer receiving the control signals from the control bus, and concurrently providing commands to the first memory circuit and the second memory circuit;
a single data buffer for data input/output interposed between the data bus and the first and second memory circuits;
a signal provide circuit receiving the clock signal from the memory controller, and providing the clock signal to the first memory circuit during the positive phase state of the clock signal and providing the clock signal to the second memory circuit during the negative phase state of the clock signal;
a first gate coupled between the data buffer and the first memory circuit, wherein the first gate establishes or cuts off an electrical connection between the data buffer and the first memory circuit, when the clock signal is in a positive phase state; and
a second gate coupled between the data buffer and the second memory circuit, wherein the second gate establishes or cuts off an electrical connection between the data buffer and the second memory circuit, when the clock signal is in a negative phase state.

11. A memory control method comprising:
supplying a first control signal corresponding to a memory access based on a first master in synchronism with one of a rising edge and a falling edge of a clock signal and a second control signal corresponding to a memory access based on a second master in synchronism with the other of the rising edge and the falling edge of the clock signal; and
receiving and outputting input/output data of the first master and input/output data of the second master through the data bus in synchronism with one of the rising edge and the falling edge of the clock signal.

12. The memory control method according to claim 11, further comprising:
switching the basis of the first and second control signals between the rising edge and the falling edge of the clock signal.

13. The memory control method according to claim 11, further comprising:
determining the switch between the rising edge and the falling edge of the clock signal in accordance with an address of the memory access from the first master and an address of the memory access from the second master; and
allotting the first master to one of the rising edge and the falling edge of the clock signal, and the second master to the other of the rising edge and the falling edge of the clock signal in accordance with a result of the determination.

* * * * *